United States Patent [19]

Yokobori et al.

[11] Patent Number: 4,484,235

[45] Date of Patent: Nov. 20, 1984

[54] PHASE CONTROL CIRCUIT AND MAGNETIC REPRODUCING APPARATUS USING THE SAME

[75] Inventors: Nobuyoshi Yokobori, Osaka; Masashi Urayama, Neyagawa; Yoshiaki Igarashi, Ikoma, all of Japan

[73] Assignee: Matsushita Electric Industrial Co., Ltd., Osaka, Japan

[21] Appl. No.: 275,027

[22] Filed: Jun. 18, 1981

[30] Foreign Application Priority Data

Jun. 19, 1980 [JP] Japan .................................. 55-83811
Jun. 20, 1980 [JP] Japan .................................. 55-84323

[51] Int. Cl.³ .......................... G11B 21/10; H04N 5/76
[52] U.S. Cl. ....................................... 360/10.2; 360/70; 360/77; 360/10.3; 318/314
[58] Field of Search .................... 360/10.2, 70, 73, 75, 360/77, 10.3; 318/314, 318

[56] References Cited

U.S. PATENT DOCUMENTS

| | | | |
|---|---|---|---|
| 3,663,763 | 5/1972 | Frost | 360/70 |
| 3,742,132 | 6/1973 | Sanguu | 360/70 |
| 3,806,786 | 4/1974 | Inaba | 360/75 |
| 4,306,254 | 12/1981 | Koda | 360/75 |
| 4,322,755 | 3/1982 | Kosaka | 360/10.3 |

Primary Examiner—Alan Faber
Attorney, Agent, or Firm—Wenderoth, Lind & Ponack

[57] ABSTRACT

A phase control circuit for improving the stability after a predictable rotational speed change of a rotating apparatus and a magnetic reproducing apparatus for performing slow motion reproduction by means of intermittent tape transport and yet being free from transverse swings of the reproduced picture comprises a phase shift circuit which shifts the phase of the reference signal, which is produced by dividing a source signal, at a desired rate, to maintain the phase locked at the very moment during which the rotational speed change is changing. The relative speed of the magnetic head rotation is kept constant during the intermittent tape movement under the condition of the phase being locked.

20 Claims, 21 Drawing Figures

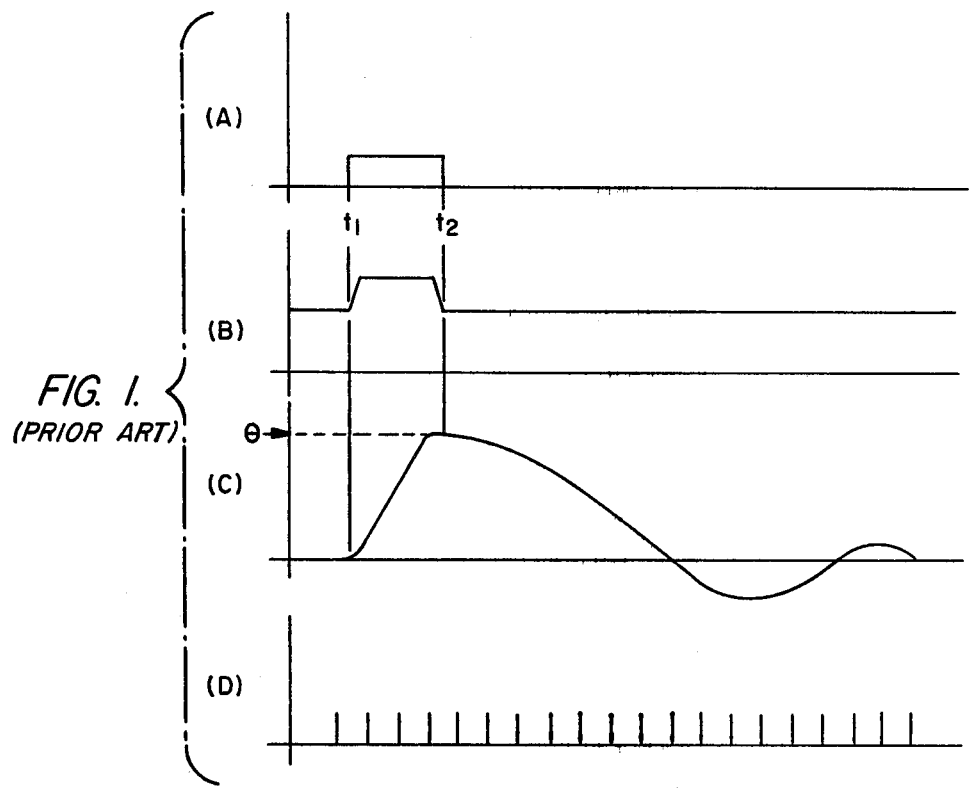
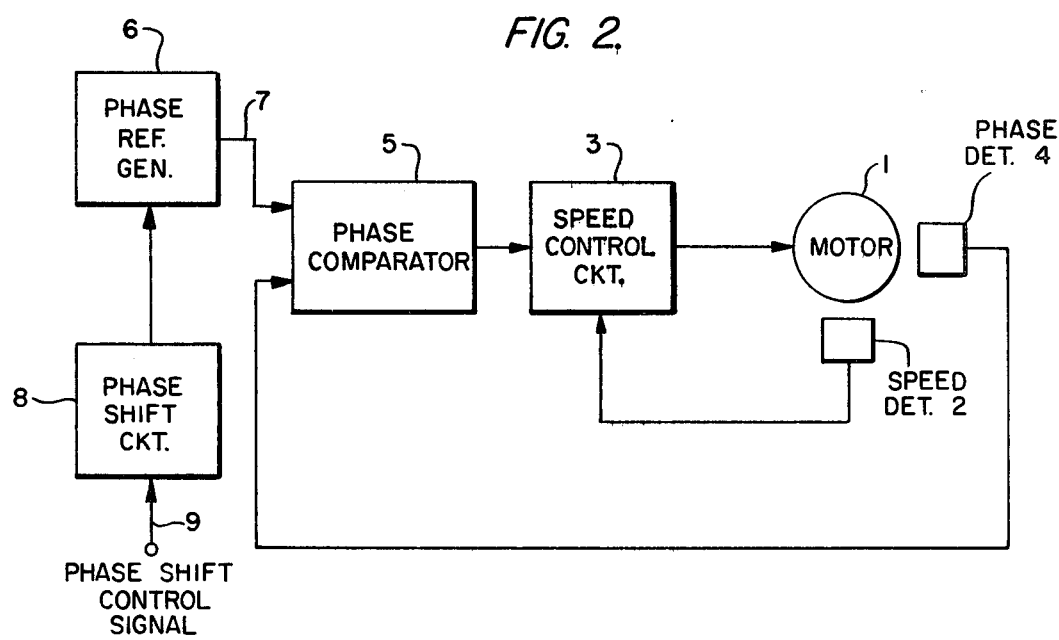

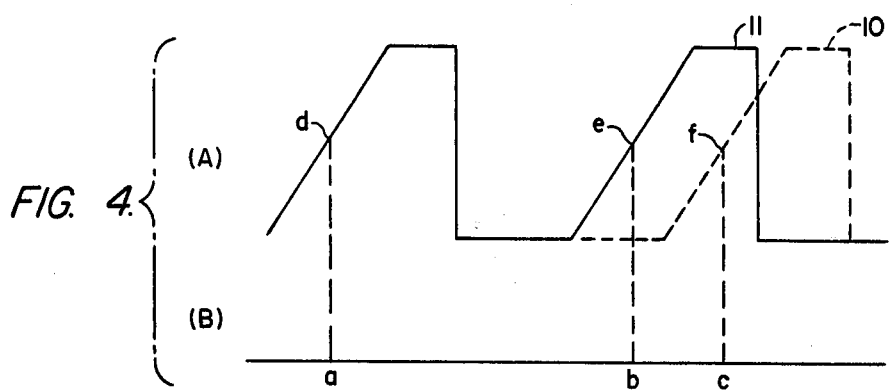
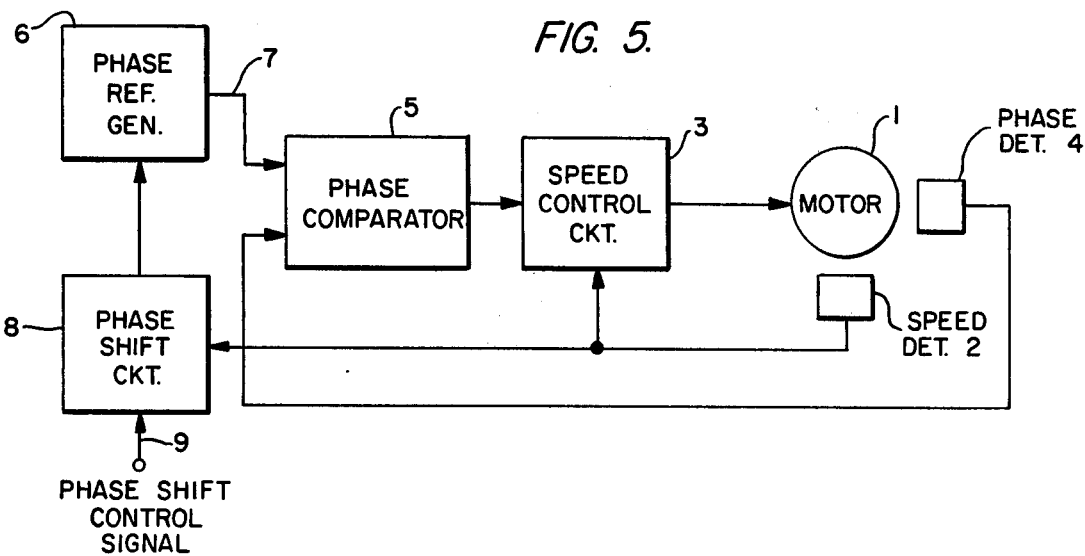
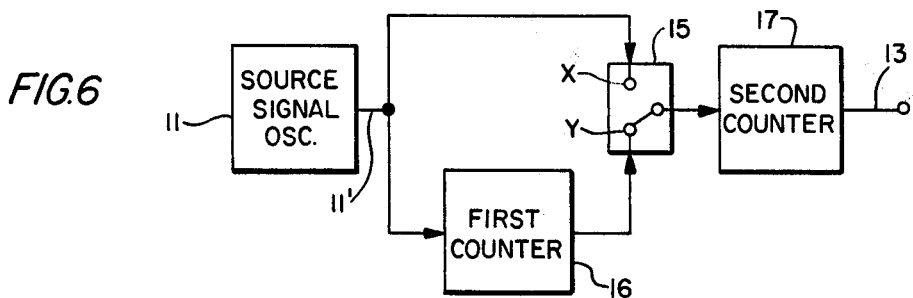
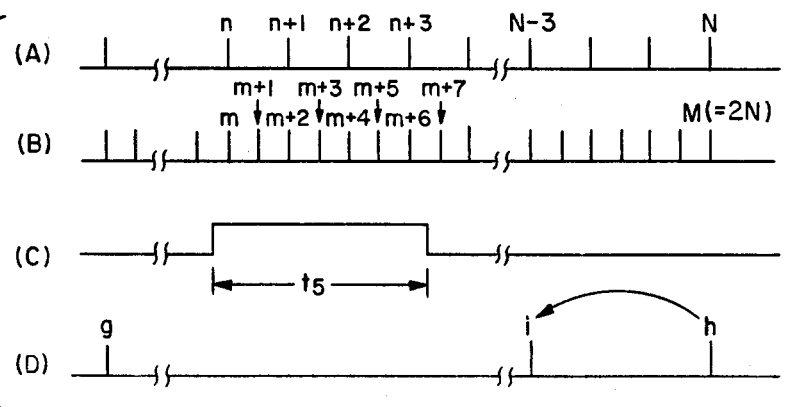

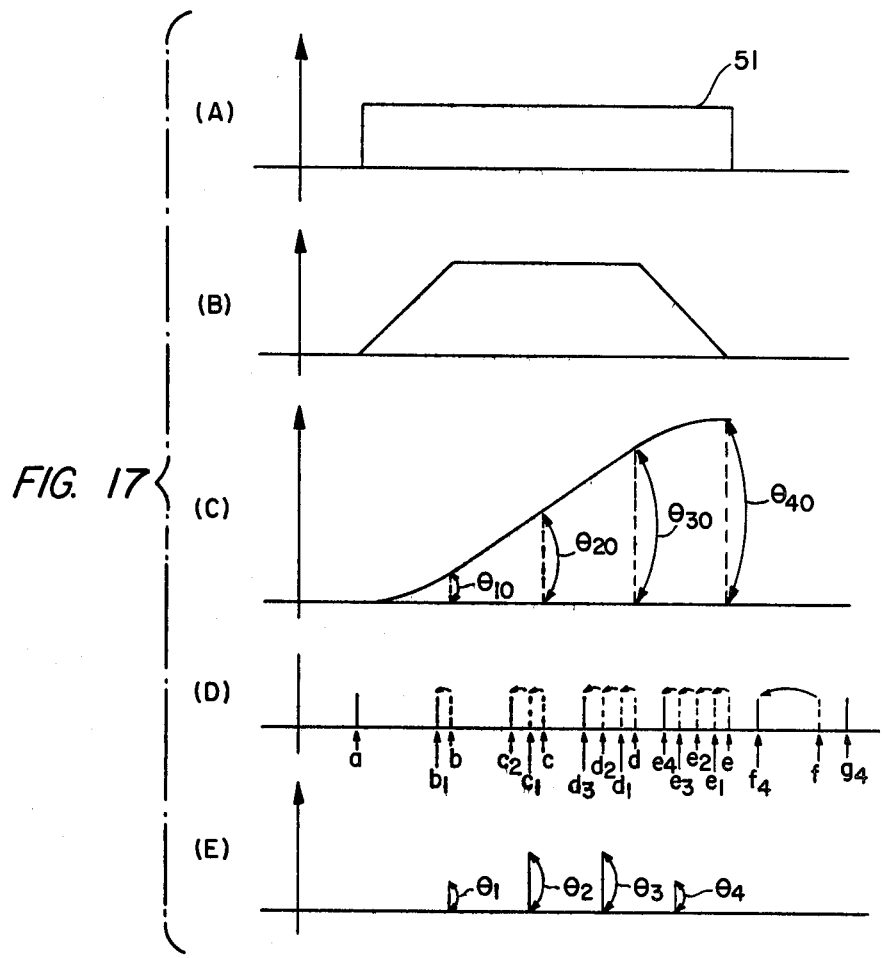
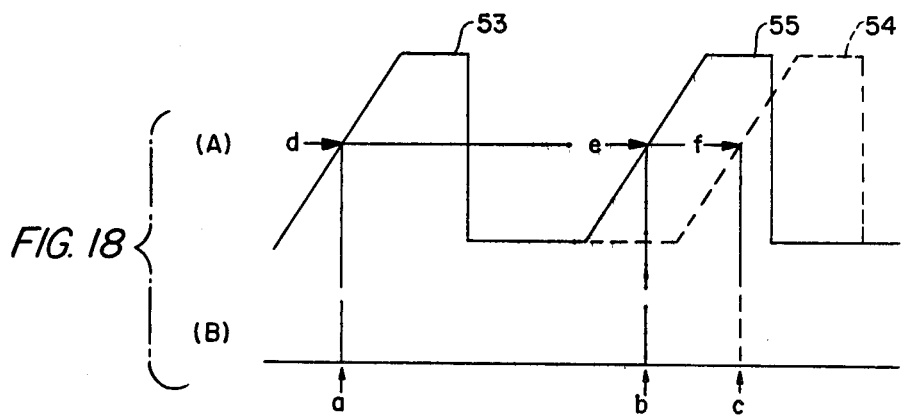

PHASE CONTROL CIRCUIT AND MAGNETIC REPRODUCING APPARATUS USING THE SAME

BACKGROUND OF THE INVENTION

This invention relates to a phase control circuit and a magnetic reproducing apparatus using the same, and more particularly to such a circuit which contributes to an improved transition stability of a rotating apparatus with speed and phase control, and to such an apparatus wherein a transverse swing of the reproduced picture due to an intermittent transporting is avoided.

Phase control circuits to control the rotational speed of a rotating apparatus so as to be constant and also to control the rotational phase thereof to maintain a certain phase difference with respect to a reference signal are widely used. Now, let us consider the stability of a system after the rotational speed of a rotating apparatus (to be herein mentioned with respect to a motor) encounters an abrupt and predictable change, either intentionally or incidentally, under the condition that the rotational speed and phase are controlled by sampling and the sampling frequency of the speed control is higher than that of the phase control.

A timing chart for prior art systems is shown in FIG. 1. Suppose a speed change command is given during time $t_1$ and $t_2$ as in FIG. 1(A), the speed control system responds quick enough as in FIG. 1(B). But as to the phase control system, the response is relatively slow due to the slow sampling rate as shown in FIG. 1(D), so that phase error lasts after speed has settled down, and the response speed depends upon the gain or response of the phase control system. Hence, the phase deviation $\theta$ as shown in FIG. 1(C) always occurs and the phase change after the time $t_2$ is inevitable due to the control system used to reduce the phase error. This is a significant disadvantage in such a system in that the transition phase change is more important than the stable phase shift. As an example of such a system, there is known a magnetic reproducing apparatus which intermittently transports a magnetic media to perform a slow motion reproduction. A video signal magnetic reproducing apparatus (VTR) using a magnetic tape (tape) is mentioned herein.

FIG. 14 shows a construction of a tape transport control system and the a rotatary head control system. The tape 31 is transported by a pinch roller 32 and a capstan 34 which is driven by a capstan motor 33. The capstan motor 33 is controlled by a control circuit 37 which accepts an output from a control head 35 and an intermittent travel control signal 36 to obtain a certain intermittent transport. The rotary heads 38 are driven by a cylinder motor 39.

Speed control circuit 44 controls the speed and phase of the cylinder motor 39 with an output of a speed detector 43 used to detect the rotational speed thereof and an output of a phase comparator circuit 42 used to compare the phase deference between an output of a phase detector used to detect the rotational phase of the cylinder motor 39 and a phase reference signal (III) which is an output of a reference signal generator 41. (I) and (II) show the direction of the tape 31's travel and rotary head 38's rotation, respectively.

FIG. 15 shows the operate timing of FIG. 14. The tape 31 is transported with the speed change as in FIG. 15(B) during the time $t_1$ and $t_2$ by the intermittent travel control signal 36 (FIG. 15(A)). In this case, the relative speed of the rotary heads 38 and the tape 31 become temporarily slower as shown in FIG. 15(C). Hence, the time axis of the reproduced video signal fluctuates. More particularly, fluctuation of a horizontal synchronizing signal period in the video signal cause a transverse swing of the reproduced picture in relation the the response characteristics of a synchronizing circuit within a television receiver. In order to compensate for this time axis fluctuation, the relative speed of the tape 31 and the rotary heads 38 is kept constant at every moment by modifying the rotational speed of the cylinder motor 39 to be accelerated as shown in FIG. 15(D). The cylinder motor 39, however, is supplied with the phase control, as mentioned above, to modify the rotational phase with respect to, the phase reference signal III as shown in FIG. 15(E). That is, the rotational phase advances in accordance with the rotational speed change, and the operation to correct the phase error is performed by the phase control circuit after the speed change has settled down because the sampling of the phase control circuit is carried out at the timing as shown in FIG. 15(F).

The aforementioned problem is caused by the relationship of the response speed of the speed and phase control systems and the period of the tape 31's intermittent travel, the problem being inevitable with the prior control system as in FIG. 14. Consequently, even after the speed change of the cylinder motor 39 has settled down, the time axis fluctuation lasts too long to exhibit the transverse swing of the reproduced picture, which is a great disadvantage.

OBJECT OF THE INVENTION

Therefore, it is an object of the present invention to provide a phase control circuit which avoids the above-mentioned disadvantage of prior art.

It is another object of this invention to provide a phase control circuit having a phase shift circuit to shift the reference signal's phase so as to keep the phase locked when the rotational speed of the rotating apparatus changes predictably.

It is another object of this invention to provide a phase control circuit having a phase shift circuit to shift reference signal's phase adaptively to a speed change of a rotating apparatus.

It is another object of this invention to provide a phase control circuit having a phase shift circuit wherein a permanent phase shift is given to the phase reference signal at a desired rate, a desired instance and a desired accuracy.

It is a further object of this invention to provide a magnetic reproducing apparatus which avoids a transverse swing of a reproduced picture when a magnetic medium is transported intermittently.

It is an additional object of this invention to provide a magnetic reproducing apparatus wherein the phase of a rotating magnetic head is kept locked at every moment during an intermittent media transport by shifting the reference signal's phase.

Other objects and advantages of this invention will be described in the following detailed descriptions.

SUMMARY OF THE INVENTION

In accordance with the present invention, a phase control circuit having a phase shift circuit is provided. The phase control circuit controls the rotational speed of a rotating apparatus so as to be constant and controls the rotational phase thereof so as to keep a certain difference with respect to a reference signal. The phase shift circuit shifts the reference signal's phase in order to maintain the phase locked at every moment when the rotational speed changes predictably, wherein the reference signal is obtained from a source oscillator by dividing the frequency thereof. The dividing rate is changed so as to cause a permanent phase shift at the reference signal, which avoids an unnecessary correction of the phase error in the phase control system, whereby the transition stability of the rotating apparatus with respect to its speed and phase control is improved.

In accordance with another embodiment, a magnetic reproducing apparatus using the same phase control circuit is provided. A magnetic medium such as a magnetic video tape is transported intermittently to perform a slow motion reproduction, wherein a phase reference signal of a magnetic head phase control system is shifted according to the tape transporting speed change; whereby a transverse swing of a reproduced picture due to the fluctuation of the synchronizing signal's phase is avoided.

BRIEF DESCRIPTION OF THE DRAWINGS

These and other objects and features of the present invention will become apparent from consideration of the following detailed descriptions of the invention taken together with the accompanying drawings, in which:

FIG. 1 is a timing chart for a prior art system;

FIG. 2 is a block diagram of a preferred embodiment of the present invention;

FIG. 3 and FIG. 4 are timing charts showing the operation of the embodiment in FIG. 2;

FIG. 5 is a block diagram of another embodiment of the present invention;

FIG. 6 is a block diagram of a phase shift circuit;

FIG. 7 shows a timing chart of the signals of the circuit shown in FIG. 6;

FIG. 17 shows a timing chart of the signals of the circuit shown in FIG. 16;

FIG. 18 is a time chart which shows waveforms of phase control;

DETAILED DESCRIPTION OF PREFERRED EMBODIMENTS

Figure 3:
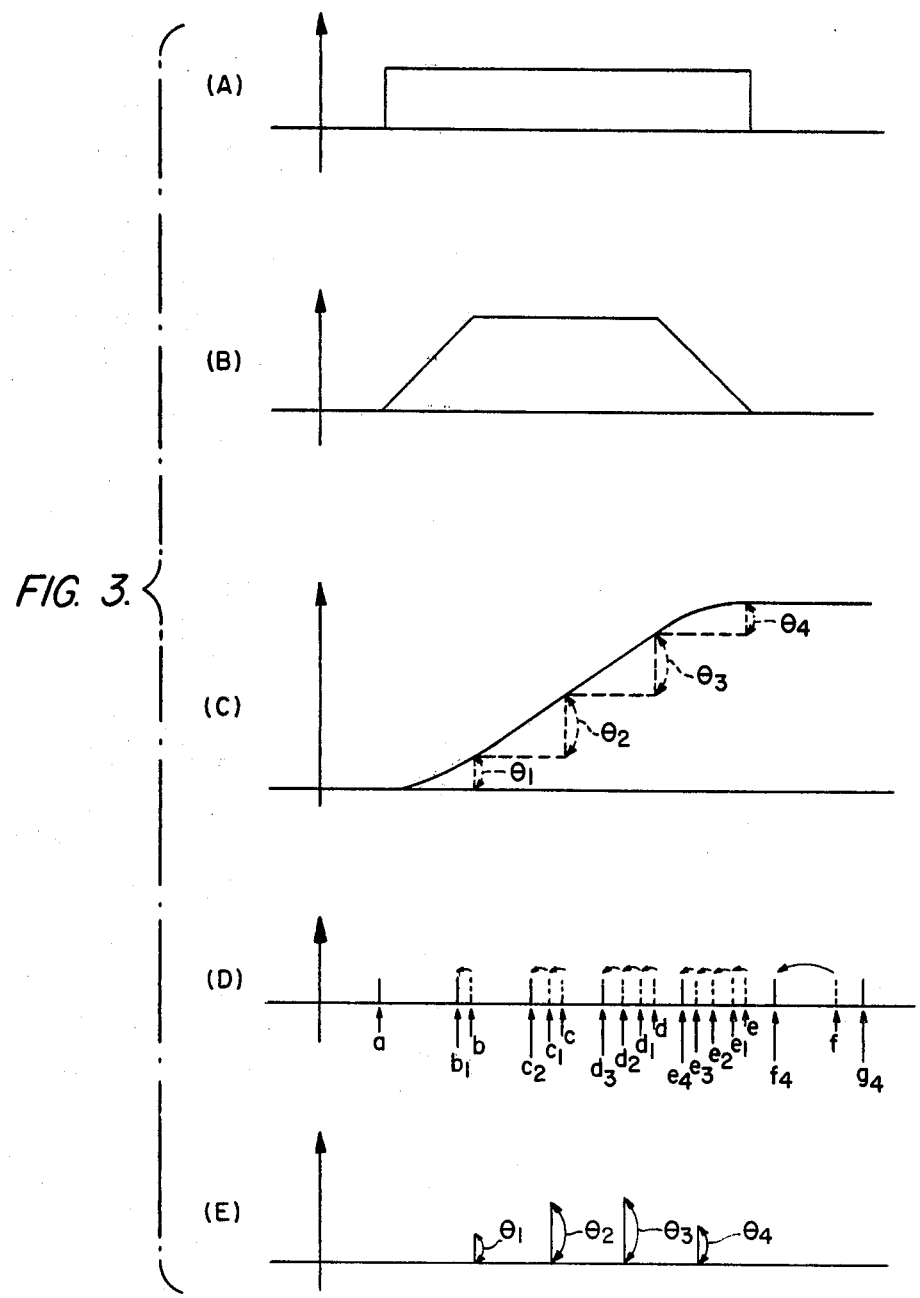

FIG. 2 is a block diagram of a preferred embodiment of the invention, the phase control circuit having a speed control system used to control the rotational speed of a motor which operates as a rotating apparatus so as to maintain a certain velocity, a phase control system used to control the rotational phase of the motor to maintain a certain phase difference with respect to the phase of a phase reference signal and a phase shift circuit. The speed control system comprises a speed detector 2 used to detect the rotational speed of the motor 1 and a speed control circuit 3, the output of the speed detector 2 being fed back thereto. The phase control system comprises a phase detector 4 used to detect the rotational phase of the motor 1, a phase reference signal generator 6 and a phase comparator 5 having 2 inputs; one input is connected to the output of the phase detector 4 and the other is the output of the phase reference generator 6, the comparator 5 ouputs a phase error signal to the speed control circuit 3, to thereby control the phase as described above. Phase shift circuit 8 operates the phase reference signal generator 6 at every occurrence of a phase shift control signal 9 so as to cause a permanent phase shift at a desired rate.

FIG. 3 shows a timing chart of the phase control circuit shown in FIG. 2. When the rotational speed of the motor 1 is abruptly but predictably changed as shown in FIG. 3(B) during a time period shown by FIG. 3(A), the speed control system responds quick enough, while the rotational phase of the motor 1 changes as shown in FIG. 3(C). Points a, b, c, d, e, ... in FIG. 3(D) represent time points of the phase reference signal 7 used to sample the motor's phase when the reference signal generator 6 is not operated by the phase shift circuit 8, which are shifted to $b_1$, $c_2$, $d_3$, $e_4$, ... as described below. As to the time point b, the reference signal 7 is shifted to $b_1$. If the time difference ($b-b_1$) corresponds to the phase difference of $\theta_1$, sampling at $b_1$ causes no phase error. As the shift is not temporary but permanent, the points c, d, e, ... are shifted to $c_1$, $d_1$, $e_1$, ... by the same amount of ($b-b_1$). At the time point $c_1$, shifting occurs to cause no phase error by the amount of ($c_1-c_2$) corresponding to the phase difference of $\theta_2$.

The next point d is automatically shifted to $d_2$ by the operations at b and c. A further shifting to compensate the phase error $\theta_3$ is operated to result at $d_3$. As to the time point e, the same compensation is performed and results at $e_4$. The compensation amount of phase at each point is shown in FIG. 3(E), consequently at time point f, shifting coresponding to the phase difference of ($\theta_1+\theta_2+\theta_3+\theta_4$) is operated to result at $f_4$. As this is a permanent shift, $f_4$, $g_4$, ... keep the time interval equal to the original time interval of a, b, c, ... Hence, though the rotational phase of the motor 1 changes as shown in FIG. 3(C), there occurs no phase error at every sampling point in appearance because the phase reference signal 7 is shifted by the phase shift circuit 8. In other words, the phase control system always maintains the phase locked at a constant phase difference between the motor 1's phase and the reference signal 14 while the speed control system controls the speed during the speed changing period, whereby after the speed change has settled down, both the speed and phase control system work at a stable point with no lasting influence of the speed change.

FIG. 4 shows how to maintain the phase locked by shifting the sampling time point. FIG. 4(A) is a waveform of trapezoid for sampling and FIG. 4(B) is a time point of the reference signal. While there is no change in speed, samplings are performed at time a and c as shown in FIG. 4(B) and voltages at d and f (FIG. 4(A)) are output from the phase comparator 5. When the motor 1's speed changes to move the trapezoid 10 to 11, the time point of the reference signal is shifted from c to sample the point e (FIG. 4(A)), which is equal in voltage to the point f at the trapezoid 10. That is, there occurs no change at the output of te phase comparator 5, which shows that the phase maintains its locked state.

FIG. 5 shows another embodiment of the invention. The output of the speed detector 2 is also fed to the phase shift circuit 8, whereby the amount of phase shift is determined adaptively to the speed change every time by forcing the reference signal generator 6 to produce a shifted reference signal according to the integration of the motor 1's speed change. Although embodiments above are described in the case of phase advance, it is apparent that the case of phase delay can be applied.

Next, embodiments of the phase shift circuit will be described.

FIG. 6 shows an embodiment of the phase reference circuit and the phase shift circuit. Reference numeral 13 is an output corresponding to the phase reference signal 7 in FIG. 2 and FIG. 5. A source signal 11' from a source signal oscillator 11 is fed to one contact X of a switch 15 and to the other contact Y of the switch 15 through a first counter 16 as a first frequency converter. The switch 15's output which is selected between the two contacts X and Y is fed to a second counter 17 to produce the reference signal 13.

At a steady state, the switch 15 is connected to the contact Y and by feeding the output of the first counter 16 to the second counter 17 serially, and a required dividing rate is obtained. The operation of FIG. 6 is explained using FIG. 7 with the dividing rate of the first counter 16 being equal to $\frac{1}{2}$ and that of the second counter 17 being equal to 2/N. FIG. 7(A) represents a pulse train of the source signal 11'. When the switch is connected to the contact Y, the dividing rate becomes $\frac{1}{2} \times 2/N = 1/N$, so that at the output of the second counter 17, the reference signal 13 is to appear at the time point g and h which is after N counts of the source signal 11' (FIG. 7(D)). When the switch 15 is temporarily connected to the contact X during a time period of $t_5$ between g and h as shown in FIG. 7(C), the source signal 11', i.e. a signal of double the frequency of that of the first counter 16's output is directly fed to the second counter 17 to cause a permanent phase shift as follows: during $t_5$, 7 pulses of m, m+1, ... m+6 are counted by the second counter, while if the switch is connected to the contact Y continuously 4 pulses of n, n+1, n+2, n+3 are to be counted. The difference of 7-4=3 is an excess counting due to the switching from Y to X, and by producing an output from the counter 17 at i earlier from h by 3 counts of the source signal, a phase advance rate of 3/N is obtained.

It is apparent from the description above that the switching from Y to X can be performed at any time between g and i and only the period $t_5$ determines the amount of phase shift. Hence the amount of phase shift is given directly and accurately.

While the dividing rate of the first counter 16 is set $\frac{1}{2}$ in the embodiment of FIG. 6, it can be chosen to be any number.

Another embodiment is derived from FIG. 6, and explained in accordance with the same figure. The first counter is replaced by a frequency multiplier and the switching contacts are exchanged with each other, that is; the second counter with the dividing rate of 1/N is directly connected to the source oscillator 11 during the steady state and a signal of a higher frequency than that of the source signal is temporarily fed from the multiplier to the second counter to cause an advancing phase shift in the same manner as described above.

Furthermore, a retarding phase shift is obtained by exchanging the contacts X and Y in FIG. 6 in the same manner as above two embodiments.

Figure 8:
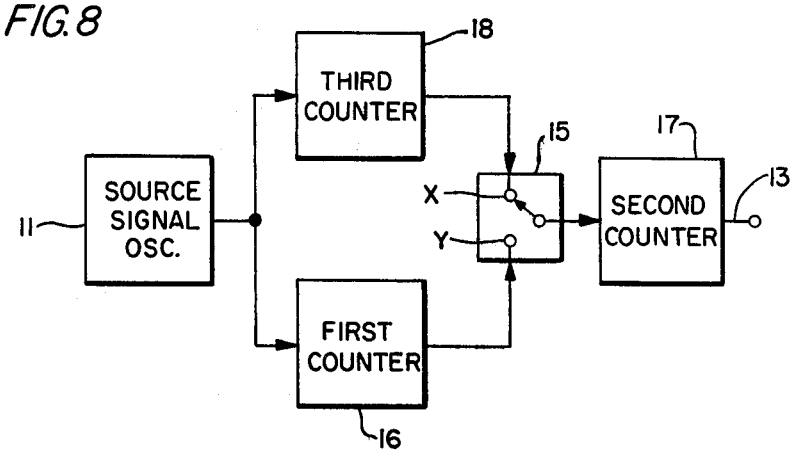
FIG. 8, FIG. 9 and FIG. 10 are block diagrams of other embodiments of a phase shift circuit.

FIG. 8 shows another embodiment of the phase reference circuit and a phase shift circuit, in which a third counter 18 with a different dividing rate from the first counter 16 is inserted between the source oscillator 11 and the contact X and by selecting the dividing rates of the counters 16, 18, an advancing or a retarding phase shift is obtained. For instance, if the frequency at the contact X is higher than that at Y and the steady state switch position is Y, an advancing phase shift is obtained by a temporary switching to the contact X for a certain period of time. The frequency of the reference signal 13 is determined by the serial dividing of the first counter 16 and the second counter 17. If the relationship of the dividing rate between the first counter 16 and the third counter 18 is exchanged, a retarding phase shift is obtained.

In FIG. 8, the third counter 18 can be replaced by a frequency multiplier to obtain an advancing phase shift. It is also possible to construct a phase shift circuit of the type in FIG. 8 with two multipliers of different multiplying rates for the two counters 16 and 18, to thereby obtain the same performance thereof.

Figure 9:
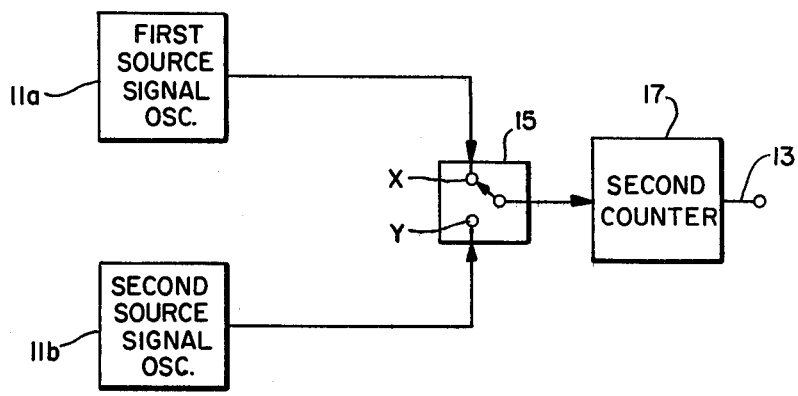

FIG. 9 shows another embodiment of a phase reference circuit and a phase shift circuit. Elements 11a and 11b are first and second source signal oscillators having different frequencies from each other. An input signal to the counter 17 is temporarily selected by the switch 15 between the two outputs of the source signal oscillators 11a and 11b to obtain a required phase shift in the same manner as described in FIG. 6.

Figure 10:
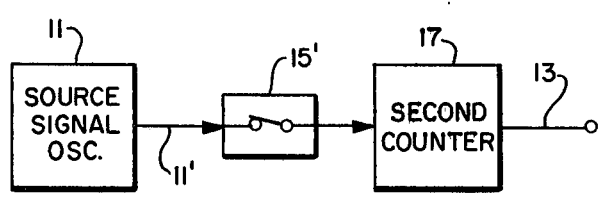
Figure 11:
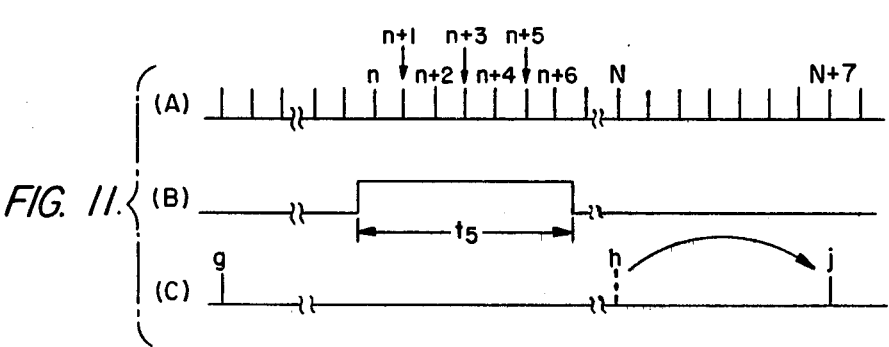
FIG. 11 shows a timing chart of the signals of the circuits shown in FIG. 10.

FIG. 10 shows another embodiment of a phase reference circuit and a phase shift circuit, in which a switch 15 breaks during the period of $t_5$ to disconnect the counter 17 from the source oscillator 11. Assuming that the dividing rate of the counter 17 is 1/N and $t_5$ corresponds to the period of 7 pulses of the source signal 11'(n, n+1, ..., n+6), the resultant reference signal 13 occurs at j later than h, which is to be the steady state time point, by a phase retardation rate of 7/N as shown in FIGS. 11(A), (B) and (C).

Figure 12:
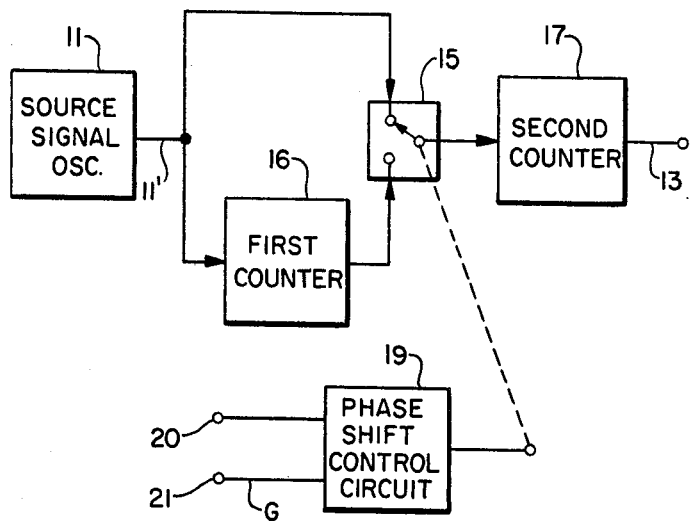
FIG. 12 is a block diagram of another embodiment of phase shift circuit.
Figure 13:
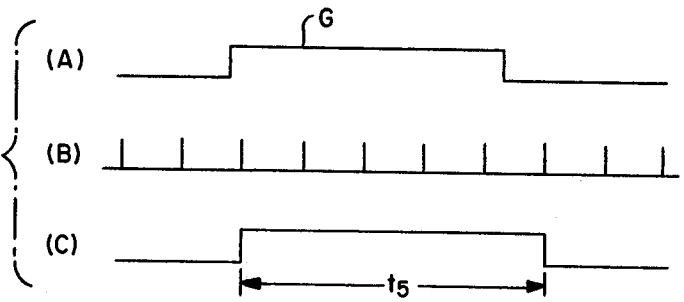
FIG. 13 shows a timing chart of the signals of the circuit shown in FIG. 12.
Figure 14:
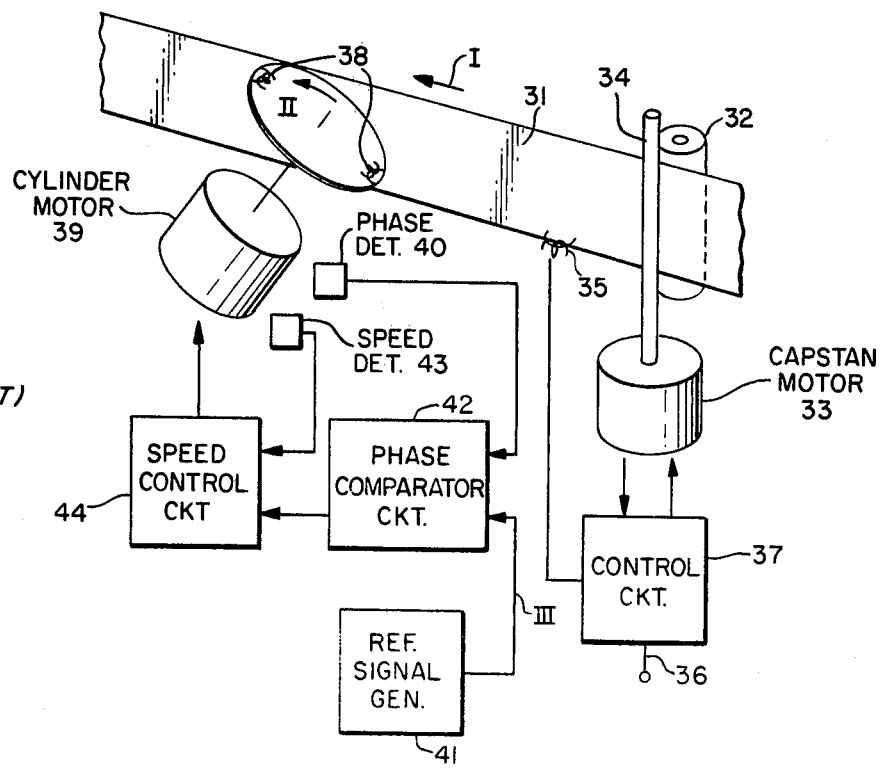
FIG. 14 is a partial block and partial construction of a prior art system.

FIG. 12 is a modified embodiment of the circuit of FIG. 6 and is used to perform a phase shift which is synchronized with the source signal. Reference numeral 19 is a phase shift control circuit used to control the switch 15, and two input signals are applied thereto; the input signal to terminal 20 is the source signal 11' or a signal synchronized with the source signal 11' and the input signal to terminal 21 is a phase shift control signal as shown in FIG. 13(A).

If the input signal to terminal 20 has a period as shown in FIG. 13(B), the phase shift control circuit 19 operates the switch to temporarily switch during period $t_5$ as shown in FIG. 13(C), that is; the first pulse in the reference signal after the phase shift control signal G's occurrence triggers a switching to X and the first pulse after the phase shift control signal G's cessation triggers a switching back to Y. Hence the switching is always synchronized with the signal applied to terminal 20, so as to thereby obtain an accurate phase shifting. If $t_5$ is obtained by counting the input signal at terminal 20 (FIG. 13(B)), the amount of the phase shift is determined by the period of the input signal (FIG. 13(B)) which is independent of the accuracy of the signal G.

The phase shift control circuit is also applied to the embodiment of FIGS. 8 and 10; as to the embodiment of FIG. 9, the same effect is obtained by switching the switch 15 so as to be synchronized with the output of either source signal oscillator 11a or 11b.

In the embodiments of FIG. 6 to FIG. 13, phase shifting is only one way, i.e. to either advance or retard; however, it is apparent that such a phase shift circuit that provides both an advanced and retarded phase shift can be selectably performed therein may be obtained by providing 3 contacts to the switch. Since the phase shift is performed at each occurrence of the phase shift control signal, the number of shifts is not limited. Logical gates are also usable as switches.

Figure 16:
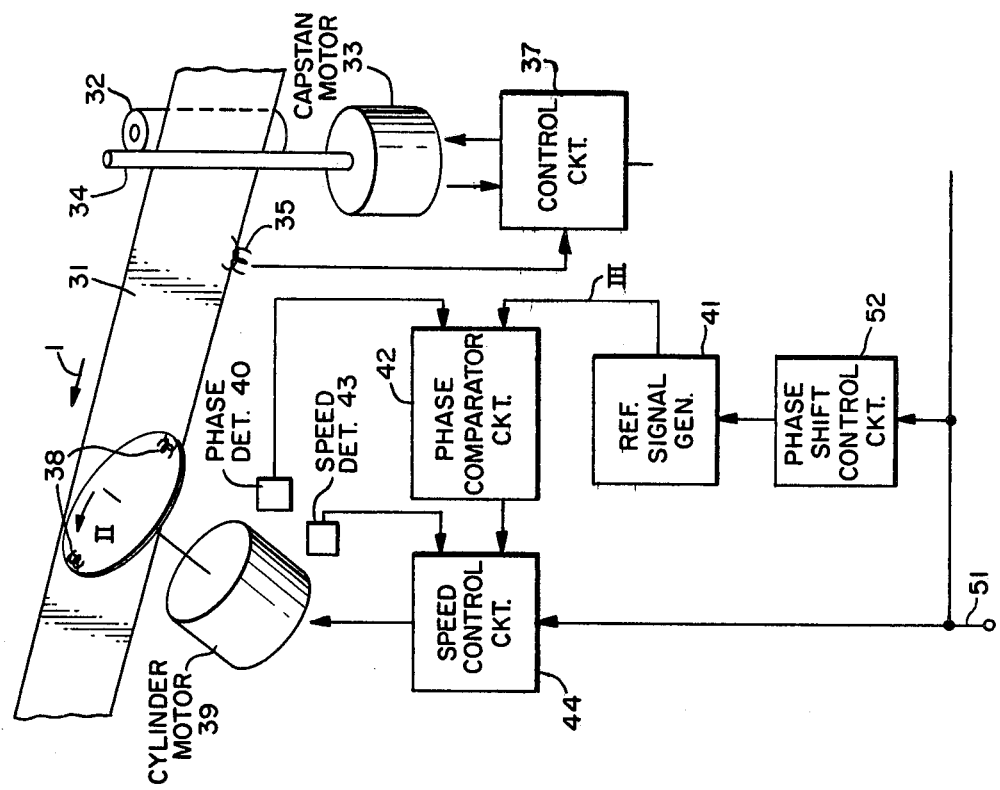
FIG. 16 is a block diagram of a cylinder motor control circuit of another embodiment of the invention.
Figure 15:
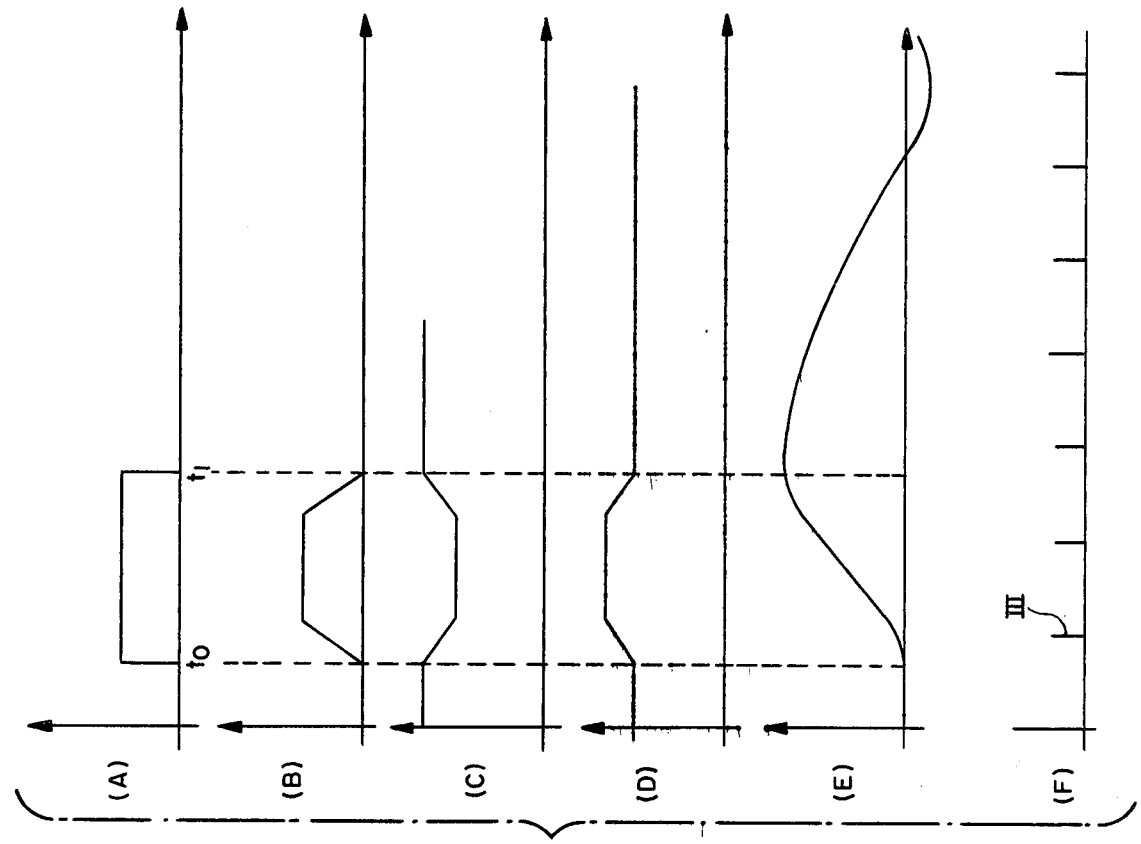
FIG. 15 shows a timing chart of the signals of the system shown in FIG. 17.

An additional embodiment is shown in FIG. 16.

FIG. 16 shows a construction of the tape transport control system and the rotary heads control system. The tape 1 is transported by a pinch roller 32 and a capstan 34 which is driven by a capstan motor 33. The capstan motor 33 is controlled by a control circuit 37 which accepts an output from a control head 35 and an intermittent travel control signal 51 to obtain a certain intermittent transport. The rotary heads 38 are driven by a cylinder motor 39.

A speed control circuit 44 controls the speed and phase of the cylinder motor 39 with an output of a speed detector 43 used to detect the rotational speed thereof and an output of a phase comparator circuit 42 used to compare the phase difference between an output of a phase detector 40 used to detect the rotational phase of the cylinder motor 39 and a phase reference signal (III) which is an output of a reference signal generator 41. Arrows (I) and (II) show the direction of the tape 31's travel and rotary head 38's rotation, respectively.

An output signal phase of the reference signal generator 41 is controlled by a phase shift circuit 52. The intermittent travel control signal 51 shown in FIG. 17(A) is also fed to the speed control circuit 44 to cause a speed change of the cylinder motor 39 as shown in FIG. 17(B) so as to keep the relative speed of the cylinder motor 39 and the tape 31 and control signal 51 is fed to the phase shift circuit 52.

As the rotational phase of the cylinder motor 39 is obtained by integrating the speed thereof, the phase change due to the speed change become as shown in FIG. 17(C) and the phase errors to the reference signal a, b, c, d, ... become $\theta_{10}$, $\theta_{20}$, $\theta_{30}$, $\theta_{40}$ as shown in FIG. 17(C). Here, the phase shift circuit 52 operates to shift the output signal b of the reference signal generator 41 to $b_1$; that is, by shifting the sampling point from b to $b_1$, a sampling is performed earlier by the time corresponding to the phase difference $\theta_1$, to thereby eliminate a phase error between the motor 39's phase and the reference signal 41's phase. The output signal phase of the reference signal generator 41 is shifted to follow $c_1$, $d_1$, $e_1$, ... At the next sampling point $c_1$, a phase shift of $c_1 \rightarrow c_2$ to compensate for the phase $\theta_2$ (FIG. 17(E)) is performed. Hence, the phase reference signal becomes $c_2$, $d_2$, $e_2$, ... At the next sampling point $d_2$, a further phase shift of $d_2 \rightarrow d_3$ to compensate for the phase $\theta_3$ is performed and at the sampling point $e_3$, a phase shift of $e_3 \rightarrow e_4$ is performed to compensate for the phase $\theta_4$. Consequently, the phase reference signal becomes $e_4$, $f_4$, $g_4$, ... to be followed at a constant period. At the sampling points b, $c_1$, $d_2$, $e_3$, phase error is always detected as equal to zero, that is, a phase locked state is maintained, and the same is true for the following points.

As mentioned above, when the rotational speed of the cylinder motor 39 is changed, the phase fluctuation after the speed has settled down is eliminated by shifting the phase of the phase reference signal 41 so as to maintain the phase locked state at every moment. In other words, during the period of the intermittent tape travel, the cylinder motor 39 is accelerated to keep the relative speed of the rotary heads and the tape constant so that the reproduced horizontal synchronizing signal frequency remains constant and the transverse swing of the picture is avoided. Moreover, the phase locked state is maintained also after the tape's travel has ceased, whereby a picture without any transverse swing at any time is reproduced.

Figure 19:
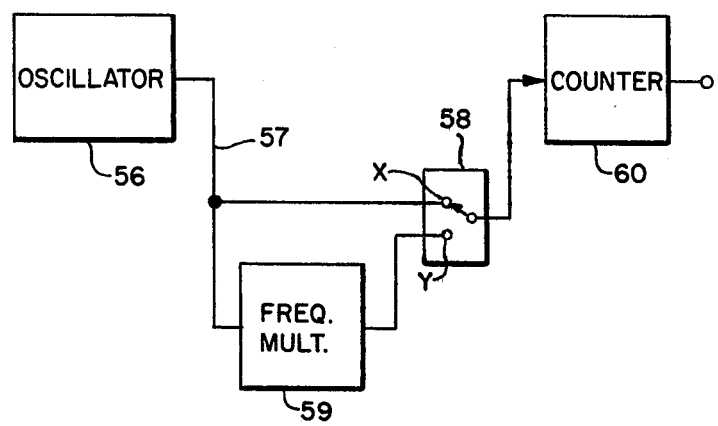
FIG. 19 is a block diagram of a phase shift circuit.

FIG. 18 shows how to maintain the phase so as to be locked by shifting the sampling time point. FIG. 18(A) is a waveform of trapezoid used for sampling and FIG. 18(B) is a time point of the reference signal. While there is no change in the cylinder motor's speed, samplings are performed at times a and c as shown in FIG. 18(B) and voltages at d and f (FIG. 18(A)) are output from the phase comparator 42. When the motor 39's speed changes to move the trapezoid 54 to 55, the time point of the reference signal is shifted from c to b to sample the point e (FIG. 18(A)), which is equal in voltage to the point f of the trapezoid 54. That is, there occurs no change at the output of the phase comparator 42, which shows that the phase maintains its locked condition. Furthermore, the phase shift circuit 52 shifts the phase of the phase reference signal by a certain amount at every operation, and maintains the phase-shifted state until the next operation is commanded. FIG. 19 shows a concrete example of a phase reference circuit and a phase shift circuit.

Referring to FIG. 19, an output 57 of an oscillator 56 is connected to one input X of a gate 58 and to an input of a frequency multiplier 59. An output of the frequency multiplier 59 is connected to the other input Y of the gate 58. An output of the gate 58 is connected to a count input of a counter 60. Assuming that: the oscillation frequency of the oscillator 56 is 3.58 MHz; the multiplication factor of the frequency multiplier 59 is 2; and the division ratio of the counter 60 is 1/59712, the cycle of the output signal of the oscillator 56 then becomes 1/3.58 MHz $\approx$ 0.27 $\mu$s and the cycle of the output signal of the frequency multiplier 59 becomes 1/7.16 MHz $\approx$ 0.135 $\mu$s. Usually, the gate 58 is in the state such that input signals to the input X are applied to the counter 60. At this time, the counter 60 generates phase reference signals every 16.7 ms.

Figure 20:
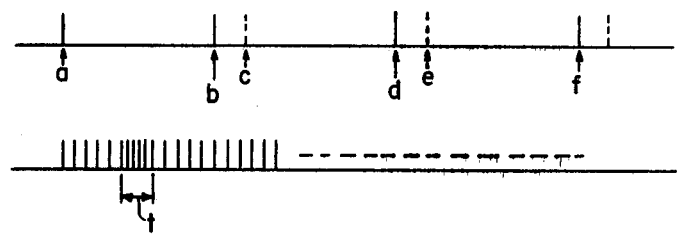
FIG. 20 shows a timing chart of the signals of the circuit shown in FIG. 19.

If the gate 58 is switched to the state wherein the input signals to the input Y are applied to the counter 60 in a period t ($\leqq$8.33 ms), the counter 30 counts t/0.135$\times$10$^{-6}$ pulses during this period. If the gate 58 were in the state such that input signals to the input X are applied to the counter 60, the counter 60 would count 5/0.27$\times$10$^{-6}$ pulses. The difference of the count numbers is t/0.27$\times$10$^{-6}$, which is the same as the count number which is counted by the counter 60 in the period t in the usual state. In other words, the counter 60 counts up t minutes faster than usual at this time. Thus, the phase reference signal usually generated at c in FIG. 20 will be generated at b, so that the phase of the phase reference signals will lead by t. The switching time t may occur in any position in a a-b period in FIG. 20. The output signals after b will continue d, f, ... every 16.7 ms. Accordingly, the phase reference signals are phase-shifted once and the phase-shifted state will be maintained permanently. Also, if one more phase-shifting is done in a b-d period, the same result can be obtained.

Figure 21:
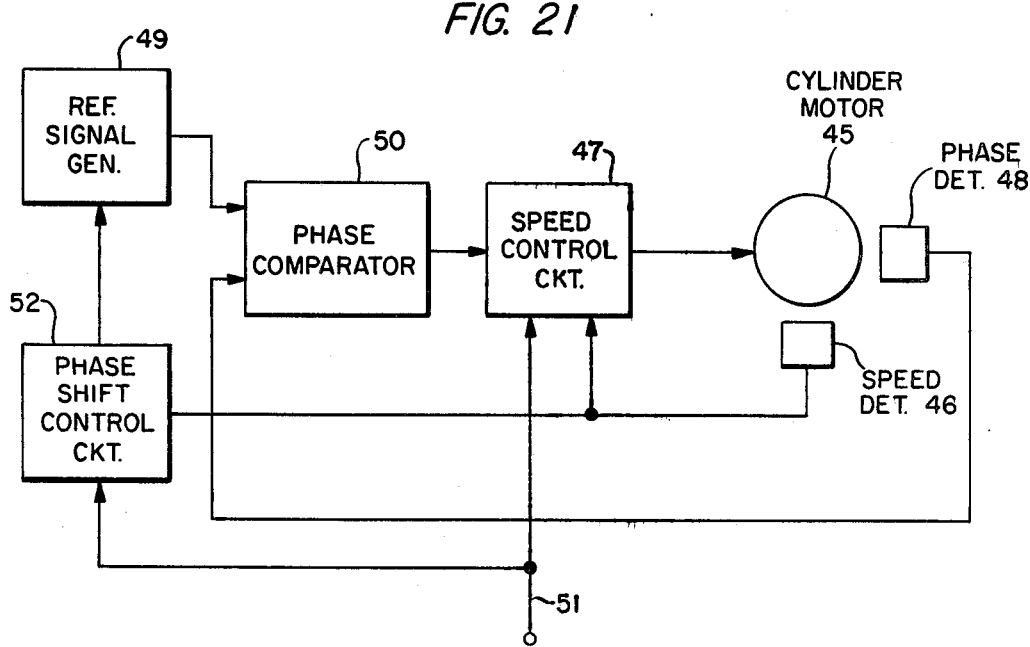
FIG. 21 is a block diagram of another embodiment of the invention.

FIG. 21 shows another embodiment of the present invention. Referring to FIG. 21, the output signals of the speed detector 46 are also applied to the phase shift control circuit 52, thereby being an input signal used for determining the phase shift amount of the phase reference signals. The phase shift control circuit 52 is triggered by the intermittent travel control signal 51, and integrates the output signals of the speed detector 46 thereby determining the phase shift amounts at each sampling point, so that the phase of the phase reference signal only follows the speed variations of the cylinder motor 45 which have been caused by the intermittent travel control signal 51. The speed variations caused by the other reasons are controlled by the well-known speed control and phase control.

In the above embodiment, the rotational speed of the cylinder motor is increased during the intermittent tape travel thereby leading the phase of the phase reference signals. In the same way, it can be also arranged so as to lag the phase of the phase reference signals when the tape travel direction is reversed, and in this case, a frequency divider will be used instead of the frequency multiplier 59 for the phase shift circuit 22.

As described above, according to the present invention, for keeping constant the relative speed between the magnetic tape and the rotary head by changing the rotational speed of the cylinder motor during the intermittent magnetic tape travel, the phase reference signal for the phase control of the cylinder motor is phase-shifted, thereby keeping the phase synchronized state, so that the fluctuation of the reproduced signals on the time axis is eliminated thereby being free from transverse swing of the reproduced picture. Thus, the present invention is very effective for performing slow motion reproducion by intermittently driving the magnetic tape in a helical scan type video tape recorder.

What is claimed is:

1. A phase control circuit, comprising:
    a speed control means for controlling the rotational speed of a rotating apparatus;
    a phase control means for controlling the rotational phase of said rotating apparatus so as to have a constant difference from a phase of a reference signal by comparing said rotational phase and said reference signal's phase; and
    a phase shift circuit means for shifting the phase of said reference signal, said phase control means including said speed control means, said phase of said reference signal being shifted according to a temporary speed change of said rotating apparatus so as to maintain said phase locked during and after said speed change.

2. A phase control circuit according to claim 1, wherein said speed control means comprises a speed detector means for detecting said rotational speed of said rotating apparatus and for determining the amount of said phase shift of said reference signal.

3. A phase control circuit according to claims 1 or 2, wherein said phase shift circuit means comprises:
    an oscillator means for generating a source signal;
    a first frequency converter means for dividing or multiplying the frequency of said source signal by a predetermined rate;
    a second frequency converter means for dividing or multiplying said frequency of said source signal by a different rate from that of said first frequency converter means;
    a counter means for dividing an input signal fed thereto to produce said reference signal; and
    a switch means for selectively connecting said counter means to either of said first and second frequency converter means so as to obtain either an advanced phase shift or a retarded phase shift by temporarily changing said frequency of said signal fed to said counter means so as to be respectively either higher or lower during a certain period according to the required amount of said phase shift of said reference signal.

4. A phase control circuit according to claim 3, wherein said rate of either said first or second frequency converter means is equal to 1.

5. A phase control circuit according to claim 4, wherein said switch means is synchronized with either said source signal or a signal which is synchronized with said source signal.

6. A phase control circuit according to claim 3, wherein said switch means is synchronized with either said source signal or a signal which is synchronized with said source signal.

7. A phase control circuit according to claims 1 or 2, wherein said phase shift circuit means comprises:
    a first and a second oscillator means with different frequencies from each other;
    a counter means for dividing an input signal fed thereto to produce said reference signal; and
    a switch means for selectively connecting said counter means to either of said first and second oscillator means so as to obtain either an advanced phase shift or a retarded phase shift by temporarily changing said frequency of said signal fed to said counter means so as to be respectively either higher or lower during a certain period according to the required amount of said phase shift of said reference signal.

8. A phase control circuit according to claim 7, wherein said switch means is synchronized with either said first or second oscillator means.

9. A phase control circuit according to claim 1 or 2, wherein said phase shift circuit means comprises:
    an oscillator means for generating a source signal;
    a counter means for producing said reference signal by dividing said source signal; and
    a switch means for disconnecting said counter means from said oscillator means, whereby said switch means disconnects said counter means from said oscillator means during a certain period corresponding to a required phase shift to produce a retarded phase shift.

10. A phase control circuit according to claim 9, wherein said switch means is synchronized with either said source signal or a signal which is synchronized with said source signal.

11. A magnetic reproducing apparatus comprising:
    a plurality of rotary heads for reproducing a signal recorded on a magnetic tape;
    a cylinder motor for driving said rotary heads;
    a phase detector means for detecting a rotational phase of said cylinder motor;
    a phase reference signal generator means for generating a reference signal;

a phase shift circuit means for shifting a phase of said reference signal by a desired amount;

a phase comparator circuit means for comparing the phases of an output of said phase detector means and that of said reference signal; and a speed control circuit means for controlling a speed of said cylinder motor, an output of said phase comparator means being fed thereto, wherein when obtaining a slow motion reproduction by an intermittent travel of said magnetic tape, a transverse swing of a reproduced picture is eliminated by maintaining a constant relative speed between said magnetic tape and said rotary heads at every moment by changing said cylinder motor's speed according to said tape's travel and by maintaining a phase locked state at evey moment by shifting said reference signal's phase by the amount corresponding to a phase change of said cylinder motor due to said speed change thereof.

12. A magnetic reproducing apparatus according to claim 11, wherein said speed control means further comprises a speed detector means for detecting said rotational speed of said cylinder motor so as to control said rotational speed together with said output of said phase comparator circuit means and also for determining said amount of said phase shift.

13. A magnetic reproducing apparatus according to claims 10 or 11, wherein said phase shift circuit means comprises:

an oscillator means for generating a source signal;

a first frequency converter means for dividing or multiplying the frequency of said source signal by a predetermined rate;

a second frequency converter means for dividing or multiplying said frequency of said source signal by a different rate from said first frequency converter means;

a counter means for dividing an input signal fed thereto to produce said reference signal; and a switch means for selectively connecting said counter means to either of said first and second frequency converter means so as to obtain either an advanced phase shift or a retarded phase shift by temporarily changing said frequency of said signal fed to said counter means so as to be respectively either higher or lower during a certain period according to the required amount of said phase shift of said reference signal.

14. A magnetic reproducing apparatus according to claim 13, wherein said rate of either said first or second frequency converter means is equal to 1.

15. A magnetic reproducing apparatus according to claim 14, wherein said switch means is synchronized with either said source signal or a signal which is synchronized with said source signal.

16. A magnetic reproducing apparatus according to claim 13, wherein said switch means is synchronized with either said source signal or a signal which is synchronized with said source signal.

17. A magnetic reproducing apparatus according to claim 11 or 12, wherein said phase shift circuit means comprises:

a first and a second oscillator means with different frequencies from each other;

a counter means for dividing an input signal fed thereto to produce said reference signal; and a switch means for selectively connecting said counter means to either of said first and second oscillator means so as to obtain either an advanced phase shift or a retarded phase shift by temporarily changing said frequency of said signal fed to said counter means so as to be either respectively higher or lower during a certain period according to the required amount of said phase shift of said reference signal.

18. A magnetic reproducing apparatus according to claim 17, wherein said switch means is synchronized with either said first or second oscillator means.

19. A magnetic reproducing apparatus according to claim 11 or 12, wherein said phase shift circuit means comprises:

an oscillator means for generating a source signal;

a counter means for producing said reference signal by dividing said source signal; and a switch means for disconnecting said counter means from said oscillator means, whereby said switch means disconnects said counter means from said oscillator means during a certain period corresponding to a required phase shift to produce a retarded phase shift.

20. A magnetic reproducing apparatus according to claim 19, wherein said switch means is synchronized with either said source signal or a signal which is synchronized with said source signal.

* * * * *